May 21, 1929.　　　　H. H. MILLER　　　　1,714,099
CHURN
Filed Oct. 7, 1925　　　3 Sheets-Sheet 1
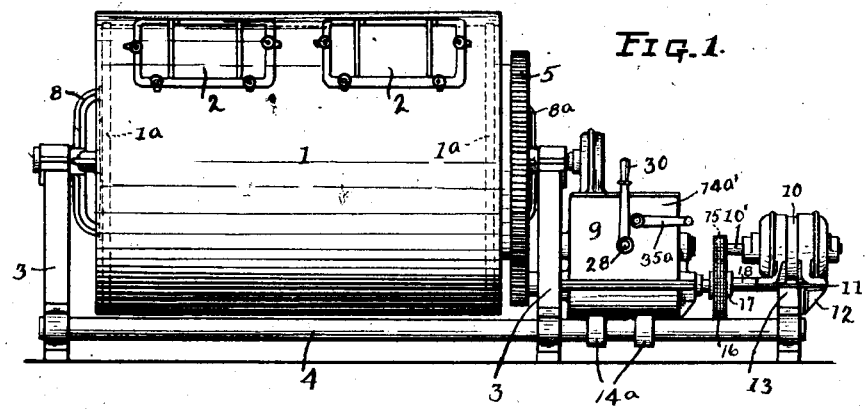
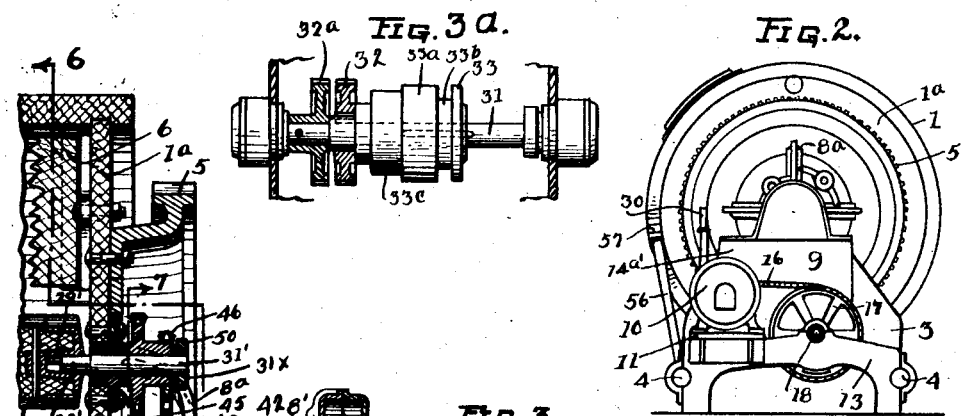
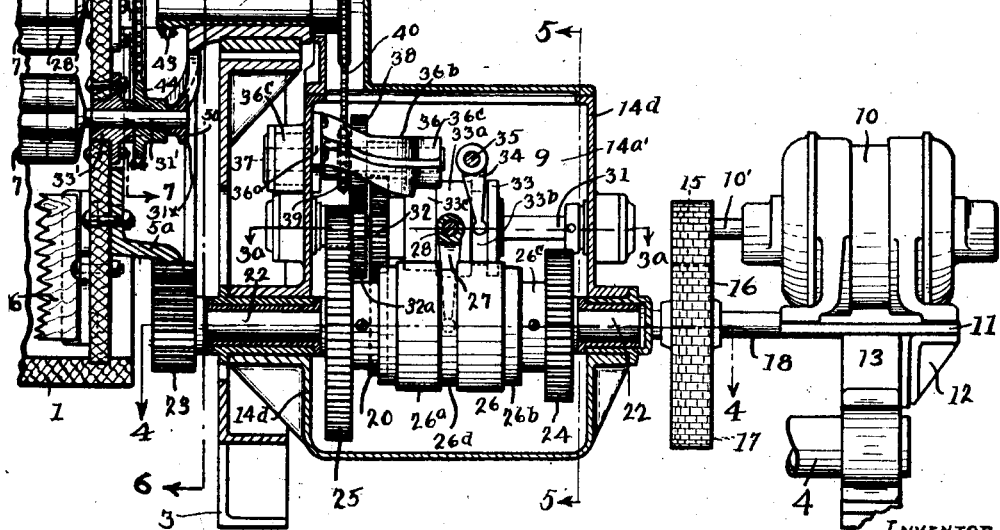

May 21, 1929.  H. H. MILLER  1,714,099

CHURN

Filed Oct. 7, 1925  3 Sheets-Sheet 2

INVENTOR
Harvey H. Miller
By Geo. B. Pitts
ATTORNEY

May 21, 1929.  H. H. MILLER  1,714,099
CHURN
Filed Oct. 7, 1925  3 Sheets-Sheet 3
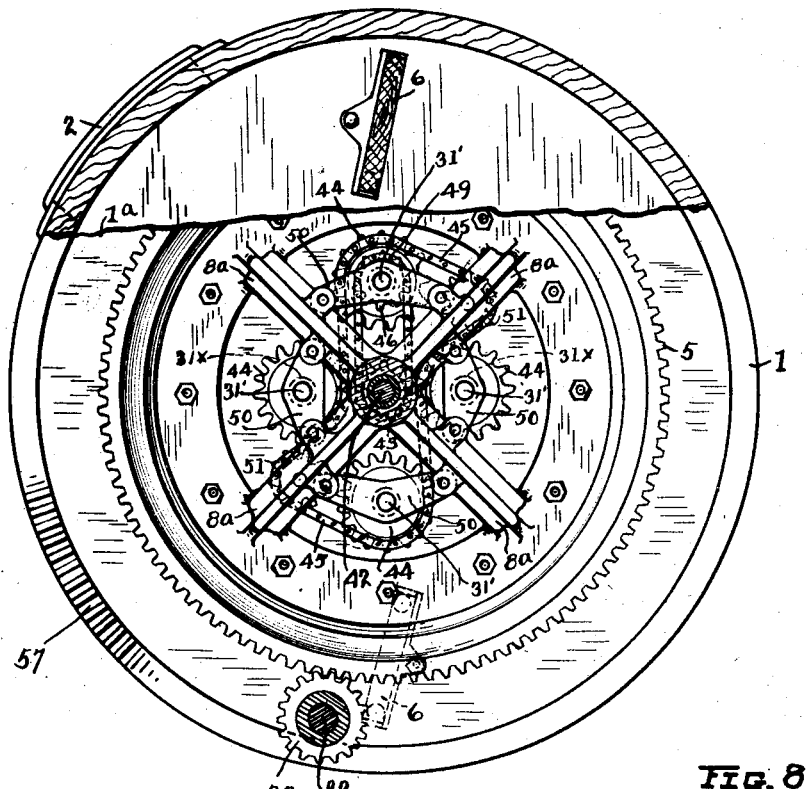
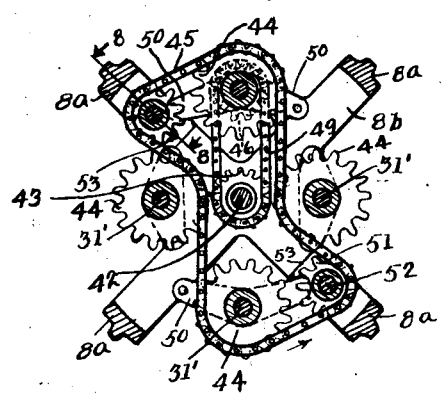
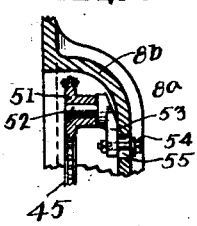
INVENTOR
Harvey H. Miller
By Geo. A. Pitts
ATTORNEY Patented May 21, 1929.

1,714,099

UNITED STATES PATENT OFFICE.

HARVEY H. MILLER, OF CANTON, OHIO, ASSIGNOR TO THE H. H. MILLER INDUSTRIES COMPANY, OF CANTON, OHIO, A CORPORATION OF OHIO.

CHURN.

Application filed October 7, 1925. Serial No. 60,986.

This invention relates to a churn, more particularly a churn of the drum type generally known as a combined churn and butter worker.

One object of the invention is to provide an improved driving mechanism for the drum and working rolls, whereby they may be driven positively and the drum driven independently of the rolls in a ready manner, as desired.

Another object of the invention is to provide a driving mechanism of relatively simple construction and one which permits of sanitary conditions in the operation of the churn by the enclosure thereof in a casing or housing to prevent the splashing of water and milk thereon and thus insure complete lubrication of the driving mechanism at all times.

Another object of the invention is to construct a driving mechanism for a churn which may be easily and readily controlled and operated.

A further object of the invention is to so support the driving mechanism that it may be adjusted to compensate for wear and spacing between the driving elements which transmit the power from the driving mechanism to the drum.

Other objects of the invention would be apparent to those skilled in the art to which my invention relates from the following description taken in connection with the accompanying drawings, wherein Fig. 1 is a side elevation of a churn having a drive mechanism embodying my invention.

Fig. 2 is an end elevation of the churn and driving mechanism.

Fig. 3 is a fragmentary section on the line 3—3 of Fig. 5.

Fig. 3ª is a fragmentary section on the line 3ª—3ª of Fig. 3.

Figure 4:
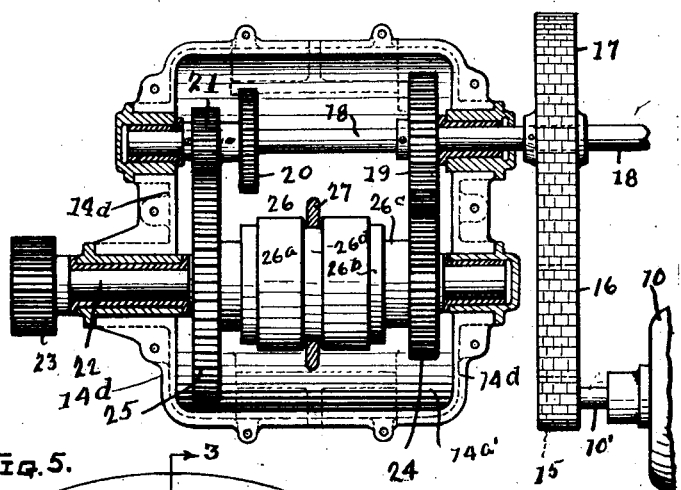

Fig. 4 is a fragmentary section on the line 4—4 of Fig. 3.

Figure 5:
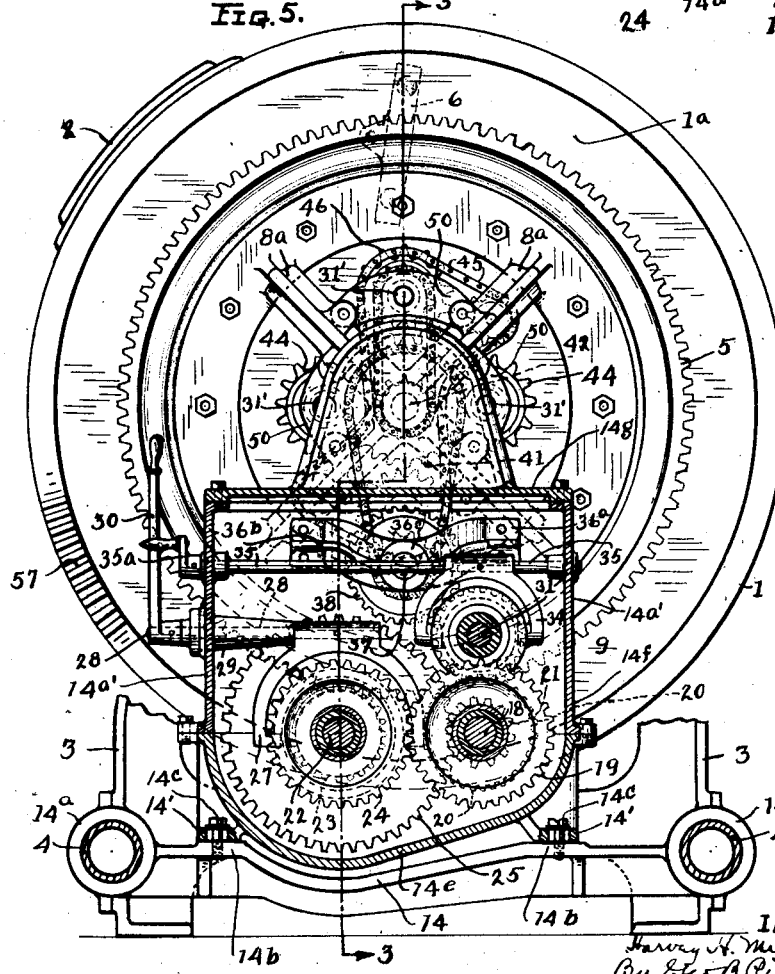

Fig. 5 is a section on the line 5—5 of Fig. 3.

Fig. 6 is a section on the line 6—6 of Fig. 3.

Fig. 7 is a section on the line 7—7 of Fig. 3.

Fig. 8 is a section on the line 8—8 of Fig. 7.

In the drawings, 1 indicates a drum, which may be of any usual or preferred form of construction. The drum 1 is provided with one or more doors 2, which may be removed or opened in any desired manner. The drum rotates on a horizontal axis, being mounted at its opposite ends in a pair of pedestals 3, preferably bolted or otherwise rigidly connected to a pair of spaced, longitudinally extending frame members 4, whereby the pedestals are supported in vertical spaced position. At one end the head 1ª of the drum 1 is provided with a relatively large ring gear 5, preferably of the spur type, by means of which the drum is rotated at a relatively fast or relatively slow speed in the manner to be later set forth. The ring gear 5 is secured to the drum head 1ª in any desired manner. 6 indicates a pair of butter lifting flights or shelves mounted in substantially diametrical relation and arranged to lift the butter and deliver it to the working rolls 7 on the rising side of the drum 1, during the rotation of the latter. Each of the working rolls 7 is rotatably mounted at its opposite ends in the drum heads 1ª. In the preferred construction and arrangement I provide four butter working rolls 7 disposed, correlated and mounted in the manner shown in patent #1,390,343, granted to Reuben B. Disbrow, September 13, 1921, although the shape of the rolls may be varied as desired. 8, 8ª indicate gudgeons secured to the drum heads 1ª and provided with laterally extending axles or hubs 8' which form the trunnions on which the drum rotates, suitable bearings being provided in the pedestals to receive the axles of the gudgeons 8, 8ª.

The driving mechanism, indicated as an entirety at 9, may be driven in any desired manner, but for illustrative purposes I have shown an electric motor 10 mounted on a base 11, which in turn is adjustably fixed to a support 12. The support 12 is carried on a cross bar 13 which extends between the frame members 4 and supports their extended ends, as shown in Fig. 2. 14 indicates a cradle supported at its opposite ends by the frame members 4 and disposed between the cross member 13 and the adjacent pedestal 3. The opposite ends of the cradle 14 are adjustable along the frame members 4 so that it and the parts carried by it may be moved toward and from the drum 1 to effect alignment of the elements of the driving mechanism 9. The connection between the opposite ends of the cradle 14 and the members 4 may be provided by means of collars or sleeves 14ª slidably fitting the frame members 4. The cradle 14 serves as a support for a casing or housing 14ᵃ' (which encloses certain elements of the driving mechanism), being fixed thereto in any suitable manner. In the preferred arrangement and construction, the casing 14ᵃ' is provided with feet 14' which engage seats or rests 14ᵇ, the feet and seats being formed with openings to receive cap screws 14ᶜ, whereby the casing is rigidly secured to the cradle 14. The openings in the feet are elongated to permit the adjustment of the casing transversely of the frame members 4 for a purpose which will later appear. The casing 14ᵃ' is preferably of sectional construction to provide for assembly and disassembly of the driving mechanism and ready access thereto.

The shaft 10' of the motor 10 extends inwardly and carries a sprocket 15 for a chain 16, which runs around a sprocket 17 fixed to a main driving shaft 18. The shaft 18 is mounted in suitable bearings provided in the support 12 and end walls 14ᵈ of the casing 14ᵃ'. 19, 20, 21, indicate gears fixed to the shaft 18 within the casing 14ᵃ'. The purpose of the gears 19, 20, 21, will be later described.

22 indicates a counter-shaft mounted in suitable bearings provided in the end walls 14ᵈ of the casing 14ᵃ'. The inner end of the shaft 22 extends through the casing end wall and carries on its extended end a pinion 23 adapted to mesh with the ring gear 5 and through the latter to rotate the drum 1. 24, 25, indicate gears loosely mounted on the shaft 22 in line and meshing with the gears 19, 21, respectively, whereby the gears 24 and 25 are continuously driven. As shown, the gear 25, is relatively large as compared to its meshing gear 21, so that when the gear 25 is connected to the shaft 22 (as will be later set forth), the drum 1 will be rotated at a relatively low speed as is required in effecting the working of the butter in making a batch thereof; whereas the gears 24 and 19 are substantially of the same size, so that when the gear 24 is connected with the shaft 22 (as will be later set forth), the drum 1 will be rotated at a faster speed, as is required during the churning of a batch of material in the operation of making butter. 26 indicates a clutch mechanism disposed between the gears 24, 25, and arranged to connect either thereof to the shaft 22 to effect rotation thereof and through it rotation of the drum 1 as just described. The clutch 26 preferably comprises a member 26ᵃ splined to and slidable in opposite directions on the shaft 22. The member 26ᵃ is provided with clutch-jaw elements (not shown) upon its opposite ends arranged to engage clutch-jaw elements (not shown) on the inner faces of the gears 24, 25. Each of the clutch-jaw elements for the gears consists of a disk member 26ᵇ carrying the clutch jaws and a hub 26ᶜ on which the gear 24 or 25 is mounted, the latter being fixed to the hub in any desired manner. The slidable member 26ᵃ is formed with an annular groove 26ᵈ arranged to receive the free ends of a yoke member 27, depending from a rock shaft 28. The rock shaft 28 is mounted in a hollow boss 29 on the inner face of the casing 14ᵃ' and extends through the latter, being provided on its outer end with a handle 30, whereby it may be rocked to operate the yoke member 27. When the clutch member 26ᵃ is in mid position, it is disengaged from both gears 24, 25, but by movement thereof in either direction, it will engage one of the gears and thereby connect the latter to the shaft 22 to drive it at the desired speed, accordingly as one or the other gear 24, 25, is engaged.

31 indicates a separate shaft extending through the casing 14ᵃ' and mounted in suitable bearings provided on the end walls thereof. 32 indicates a gear loosely mounted on the shaft 31 and meshing with the gear 20. 33 indicates a clutch for connecting the gear 32 with the shaft 31 and disconnecting it therefrom. The clutch-jaw elements of the clutch 33 may be similar in construction to the clutch mechanism 26, except that it is a single clutch. The clutch member 33ᵃ of the clutch 33 is formed with an annular groove 33ᵇ which receives the free ends of a yoke member 34. The yoke member 34 is connected to a rock shaft 35 which is mounted in bearings in the side walls of the casing 14ᵃ'. One end of the shaft 35 extends through the adjacent side wall and carries a handle 35ᵃ whereby it may be operated to throw the clutch element 33ᵃ into engagement with the clutch-element 33ᶜ secured to the gear 32 and out of engagement therewith. 32ᵃ indicates a gear fixed to the shaft 31. The purpose of the gear 32ᵃ will later appear.

36 indicates a frame supported in any suitable manner on the inner end wall of the casing 14ᵃ', within the latter and comprising a base section 36ᵃ and a bracket section 36ᵇ which are provided with hollow bosses 36ᶜ aligned with each other and adapted to support bearings for a shaft 37. 38 indicates a gear mounted on the shaft 37 and meshing with the gear 32ᵃ. 39 indicates a sprocket mounted on the shaft 37, and connected to or formed integrally with the gear 38. 40 indicates a chain running around the sprocket 39 and a sprocket 41. From the foregoing description it will be seen that when the gear 32 is connected to the shaft 31 through the clutch 33, the gear 32ᵃ will transmit the power of the shaft 18 through the gear 38 and sprocket 39 to sprocket 41; whereas when the clutch 33 is disconnected from gear 32, the sprocket 41 will not be driven. The sprocket 41 is connected to the outer end of a shaft 42 which has bearing in and extends through the axle or hub 8 of the gudgeon 8ᵃ and supports on its inner end a sprocket 43, so that driving connection may be made from the main drive shaft 18 to the butter working rolls 7 in the manner about to be described. The rolls 7, at their ends are provided with caps 28'. The caps 28' that are at the geared or driven end of the drum, are formed with angular tapered sockets 29', while the caps at the other ends of the rolls 7 are preferably formed with cylindrical sockets each of which receives a shaft (not shown) suitably mounted in the adjacent drum head 1ª. For providing for detachable engagement with the angular tapered sockets 29', short driven shafts 31' are formed with angular tapered ends 32'. The shafts 31' are extended through bearing sleeves 33', having flanges which are bolted or otherwise rigidly secured to the adjacent drum head 1ª and project outwardly therefrom. At their outer ends, the roll driving shafts 31' are provided with sprockets 44, driven by a chain 45. One of the roll driving shafts 31', outward of its sprocket 44, is provided with a sprocket 46 over which and the sprocket 43 runs a sprocket chain 49. The outer or free ends of the shafts 31' have bearing in bosses 31ˣ provided on connectors 50, which are removably supported at their ends in any desired manner on the arms 8ᵇ of the gudgeon 8ª—see Figs. 6 and 7. The chain 45 is guided from the outer portion of each sprocket for the rolls 7 which are farthest from the axis of the drum 1 to the inner portions of the other rolls 7 by a pair of sprockets 51 loosely mounted on stud shafts 52. The shafts 52 are mounted in bosses provided on plates 53 adjustably supported by two diametrical arms 8ᵇ of the gudgeon 8ª. Each plate 53 is secured to the adjacent arms 8ᵇ by a bolt 54 which extends through an elongated opening 55 formed in the arm (see Fig. 8). By loosening the nut for the bolt the sprocket may be adjusted to effect tightening of the chain 45. By guiding the chain 45 in the manner just set forth, the outer rolls will be driven on their axes in one direction and the inner rolls in the opposite direction so that they may co-act to work the butter four times in each revolution of the drum 1 as set forth in the aforesaid Letters Patent.

The casing 14ª' preferably comprises a lower section 14ᵉ, and upper section 14ᶠ and a cover section 14ᵍ; and the latter section is formed of two members so as to enclose the chain 40 and sprocket 41. In constructions of drive mechanisms of which I am aware, the various driving elements were exposed and hence became covered with water and milk due to splashing thereof. It was therefore necessary to repeatedly clean the driving mechanism so that it could be properly lubricated. In my construction, I provide a casing which prevents the splashing of materials on the driving mechanism, thus eliminating the necessity of cleaning it from time to time; on the other hand the casing forms a chamber for the lubricant so that better lubrication results.

Furthermore, as shown, the casing forms a support for the driving mechanism, so that it may be bodily adjusted, the cradle 14 being movable to permit its adjustment toward and from the churn drum and the casing 14ª' being movable transversely to effect adjustment of the pinion 23 relative to the gear 5 to secure proper meshing and compensate for wear of the gear teeth.

As will be understood from Fig. 3, the gudgeon 8ª and ring gear 5 are formed integrally, being connected by an outwardly flaring annular wall 5ª, which overhangs the sprockets 44, 43, and the chains 45, 49, so that these elements are protected to a large degree from splashings. By providing a drive mechanism consisting of gears or gear trains for rotating the drum 1 and rollers 7, I am enabled to drive them positively and to arrange all of the elements and the clutches for connecting each to a shaft in a casing which not only protects the gears and clutches from foreign materials, but eliminates possible danger to employees coming in contact with any of the driving elements. My construction of drive mechanism is also advantageous since it operates in a substantial noiseless manner, not only because such mechanism is enclosed, but because its proper lubrication may be maintained and there are no chains having long runs between their sprockets.

In the operation of making a batch of butter, the drum is first positioned as shown in Figs. 1 and 2 with the doors 2 in position to be opened, the drum 1 being held in this position by a pawl 56 engaging a ratchet 57 on the end of the drum. After the drum 1 is filled with the material to be churned and the motor 10 is started, to set the shaft 18 in operation, the clutch 26 is operated to connect the gear 24 to the shaft 22, which rotates the drum 1 relatively fast to effect the churning operation. While the drum is driven in this manner the rollers 7 revolve therewith without turning on their axes. In the operation of working the butter, the clutch 26 is engaged with the gear 25 so that the drum rotates relatively slowly and the clutch 33 is connected with the gear 38 to drive the rolls 7 on their axis to effect the working operations between them as the drum rotates.

To those skilled in the art to which my invention relates, many changes in construction and widely differing embodiments and applications of my invention will suggest themselves without departing from its spirit and scope. My disclosures and the description herein are purely illustrative and are not intended to be in any sense limiting.

What I claim is:

In apparatus of the class described, the combination with a frame, a member rotatably mounted thereon, a separate member rotatably mounted on said first mentioned member eccentrically to its axis, and a motor mounted on said frame, of a cradle adjustably secured to said frame and movable thereon in a longitudinal direction independently of said first mentioned member and said motor, a driving mechanism connected to said motor and having separate operating connections with said members whereby said members may be independently operated, and supporting means between said mechanism and said cradle permitting said mechanism to be adjusted transversely of the latter.

In testimony whereof I affix my signature.

HARVEY H. MILLER.